United States Patent
Runge et al.

(10) Patent No.: US 9,358,592 B2
(45) Date of Patent: Jun. 7, 2016

(54) MOBILE SANITARY WASH SYSTEM AND APPARATUS

(71) Applicants: Carl Runge, New York, NY (US); Chris Wilkerson, New York, NY (US)

(72) Inventors: Carl Runge, New York, NY (US); Chris Wilkerson, New York, NY (US)

(73) Assignee: Equipsystems, LLC, New York, NY (US)

( * ) Notice: Subject to any disclaimer, the term of this patent is extended or adjusted under 35 U.S.C. 154(b) by 537 days.

(21) Appl. No.: 13/756,231

(22) Filed: Jan. 31, 2013

(65) Prior Publication Data

US 2014/0209130 A1    Jul. 31, 2014

(51) Int. Cl.
*B08B 3/00*  (2006.01)
*B08B 17/02*  (2006.01)
*B60P 3/14*  (2006.01)

(52) U.S. Cl.
CPC .............. *B08B 17/025* (2013.01); *B60P 3/14* (2013.01); *B08B 3/00* (2013.01)

(58) Field of Classification Search
CPC ............ B08B 3/00; B08B 17/025; B60P 3/14
USPC ................... 134/56 D, 57 D, 58 D, 104.2
See application file for complete search history.

(56) References Cited

U.S. PATENT DOCUMENTS

| | | |
|---|---|---|
| 8,272,390 B2 | 9/2012 | McCormick et al. |
| 2007/0089766 A1 | 4/2007 | Fanourgiakis et al. |
| 2008/0000504 A1 | 1/2008 | Snyder et al. |
| 2008/0289664 A1* | 11/2008 | Rockwell et al. ............... 134/42 |
| 2008/0314419 A1 | 12/2008 | Galifi et al. |
| 2011/0168217 A1* | 7/2011 | Neff et al. ..................... 134/201 |
| 2011/0226289 A1* | 9/2011 | Forster ............... A47L 15/4204 134/111 |

* cited by examiner

*Primary Examiner* — Michael Barr
*Assistant Examiner* — Levon J Shahinian
(74) *Attorney, Agent, or Firm* — Triangle Patents, PLLC

(57) ABSTRACT

A mobile sanitary wash apparatus and system including a housing including vertical and horizontal protective enclosing walls, with at least one vertical side further including an opening for inserting equipment to be cleaned and/or sanitized, and a drainage system coupled to the flooring for receiving and collecting waste effluent for controlled transport and/or disposal.

10 Claims, 4 Drawing Sheets

MOBILE SANITARY WASH SYSTEM AND APPARATUS

BACKGROUND OF THE INVENTION

1. Field of the Invention

The present invention relates to mobile enclosures for sanitary washing of equipment, and more particularly, for mobile sanitary wash systems and methods of using the same.

2. Description of the Prior Art

Wash cabinets for a variety of applications are known in the prior art. More particularly, it is known in the relevant art to provide a mobile wash cabinet with removable enclosure walls and ceiling sections; to provide a drainage system for the enclosure; and to provide a container for collection of the wash fluid. Exemplary documents of relevance from the US Patent repository include the following documents:

U.S. Pat. Nos. 8,272,390, 7,987,862, and 6,799,591; and US Patent Application Publication Nos. 20090266384, 20090211613, 20070256712, 20050199268, 20040200503, and 20020121293 that are related and among them the first filed on Mar. 2, 2001 and first published Sep. 5, 2002 for Wash fluid containment system and Wash fluid containment system for use on an uneven surface, by inventors McCormick, et al. and assigned on the face of the documents to Hydro Engineering Equipment and Supply Company, which describe a wash fluid containment system including an elevated, fluid impervious surface upon which items to be washed are placed for washing; the surface being configured to cause wash fluid to flow to an edge of the surface and off of the surface to prevent buildup of wash fluid on the surface; a collecting trough positioned in fluid flow communication with the edges of the surface to which the fluid flows to catch and collect the fluid as it flows from the surface; used wash fluid being taken from the collecting trough for disposal or recycling and solids and debris that can be removed from the trough; wherein the basic wash pad is transportable, and may include different height walls, doors, and a ceiling optionally provided. Notably, these documents do not describe removing the walls for accessing the device to be cleaned, and do not provide for complete enclosure of the items to be cleaned for retention of the fluid within the enclosure.

US Patent Application Publication No. 20080000504 by inventors Snyder, et al., for Equipment washing apparatus with flexible wall structure, published Jan. 3, 2008, describes a washing station including a sloped deck constructed of deck modules that may be easily disconnected so that the deck modules can be moved by a forklift; sidewalls surrounding one or more sides of the deck, the sidewalls including flexible bathers made of two rows of adjacent semi-rigid, substantially transparent panels hanging from a bar, with the semi-rigid panels of one row offset from the flexible panels of the second row such that an elongate washing wand can be threaded between panels through the bather while the operator of the washing wand can observe the equipment or vehicle to be washed through the flexible bather; wash water runoff collected in a sloped, covered trough that contains a sump pump positioned in a filtered compartment Importantly, it does not disclose or describe any ceiling or complete enclosure.

US Patent Application Publication No. 20070089766 by inventors Fanourgiakis et al., for Mobile device for washing bulky articles, published Apr. 26, 2007, describes a mobile device for washing bulky items including a mobile trailer having a wash compartment formed by back, sides and a floor, wherein the floor allows waste water to be collected and pumped from the interior of the compartment; further including an open top (no ceiling), and a front wall that is lowerable to act as a ramp.

US Patent Application Publication No. 20080314419 by Inventors Galifi, et al., for Equipment for cleaning cycles or motorcycles, published Dec. 25, 2008, which describes equipment for the automatic washing of cycles or motorcycles including a positioning base with recovery system; a frame associated with that base; modular side and upper walls; a containment chamber for a motorcycle; and a plurality of delivery units associated with the frame to distribute at least one liquid product on that cycle or motorcycle, wherein the delivery units are moved by specific adjustment means able to put the liquid product on different parts of the motorcycle. Notably, it does not describe a mobile apparatus, but in fact teaches away from mobility because it requires liquid product distribution throughout the system. Furthermore, it does not have any movable or openable walls, but instead provides for two openings on opposite ends to drive the motorcycle into the enclosure.

None of the prior art is known to teach or disclose all of the components and functions of the present invention systems and methods, nor to address the need for complete containment of the wash fluid, as well as mobility and efficiency required to meet the longstanding, unmet needs of the marketplace.

SUMMARY OF THE INVENTION

The present invention relates to mobile wash cabinets or enclosures. The present invention provides a mobile sanitary wash system including a housing including vertical and horizontal protective enclosing walls, with at least one vertical side further including an opening for inserting equipment to be cleaned and/or sanitized, and a drainage system coupled to the flooring for receiving and collecting waste effluent for controlled transport and/or disposal.

It is an object of this invention to provide mobile sanitary wash apparatus, system and methods of using the apparatus and system.

Another object of this invention is to provide an apparatus including an enclosure having a plurality of vertically oriented sides that are connected at edges with each other and with a floor and a ceiling, wherein the ceiling opposes and is spaced apart from the floor; wherein one of the sides is movable between an open and a closed position for allowing insertion of item(s) to be cleaned into the enclosure; the enclosure constructed of a fluid-impervious material for containing a waste effluent within the enclosure; a plurality of drain holes positioned in the floor near the corners of the sides for receiving the effluent; drainage pipes connected to the drain holes for receiving the waste effluent and delivering the waste effluent to a reservoir; and wherein the enclosure is positioned on a framework having wheels for transporting the apparatus, thereby providing a closed system for cleaning equipment within the housing and storing the waste effluent outside the enclosure.

Still another object of this invention is to provide a system for mobile cleaning of equipment including the apparatus described in the foregoing, and further including a pumping system for evacuating the waste effluent from the reservoir.

Accordingly, a broad embodiment of this invention is directed to a mobile wash enclosure having one side that is removable or openable, or includes at least one opening to allow the insertion of equipment and/or componenets to be inserted therein for cleaning and/or sanitizing, and the enclosure further including at least one drain opening, and a reservoir for receiving all or substantially all of the waste effluent that results from cleaning the equipment thererin.

These and other aspects of the present invention will become apparent to those skilled in the art after a reading of the following description of the preferred embodiment when considered with the drawings, as they support the claimed invention.

DETAILED DESCRIPTION

Figure 1:
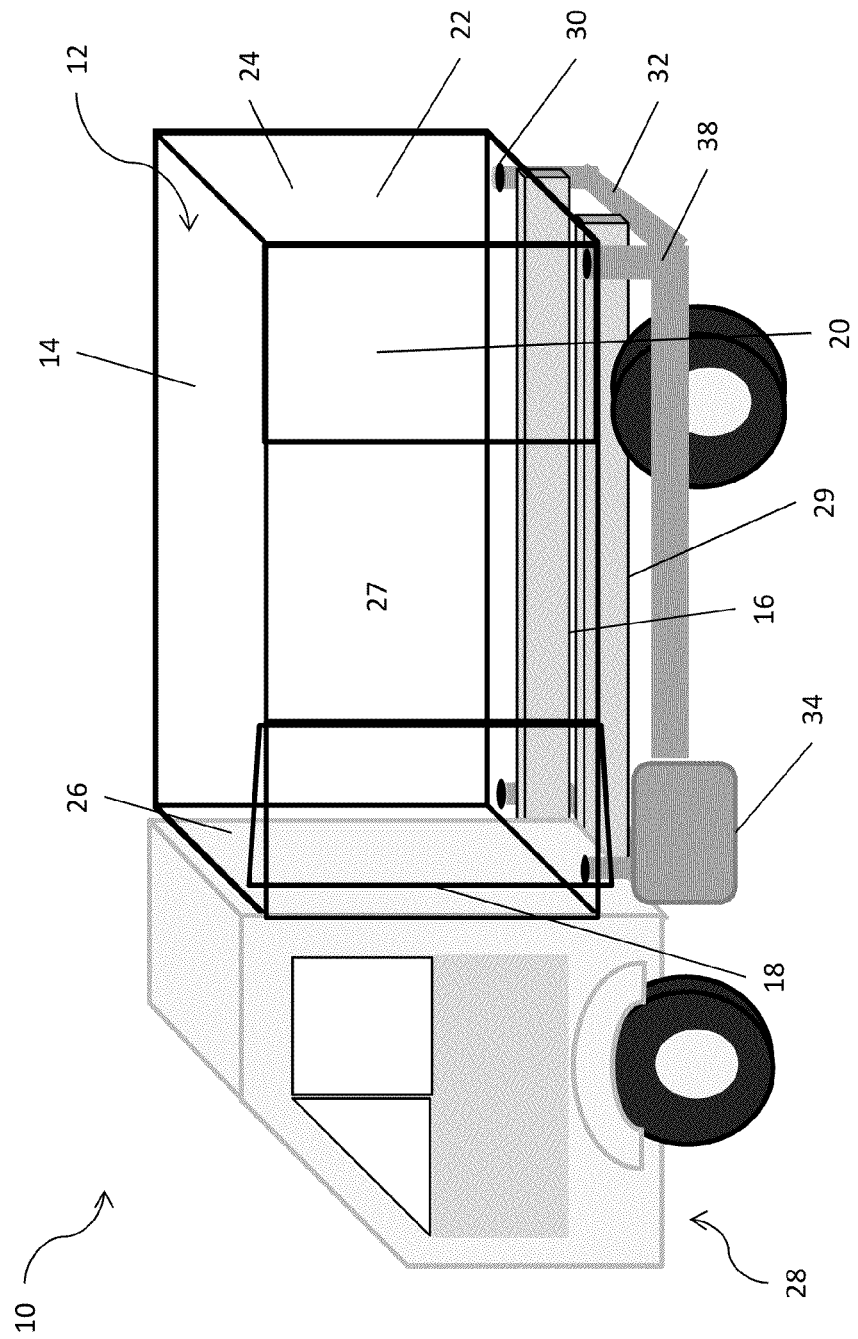
FIG. 1 is a schematic diagram illustrating a perspective view of one embodiment of the invention.

Referring now to the drawings in general, the illustrations are for the purpose of describing a preferred embodiment of the invention and are not intended to limit the invention thereto.

As shown in FIG. 1, the present invention provides a mobile sanitary wash apparatus and system, generally described as 10, which includes a housing 12 including vertical 20, 22, 24, 26 and horizontal 14, 16 protective enclosing walls, with at least one vertical side further including an opening 27 for inserting equipment to be cleaned and/or sanitized, and a drainage system 32 coupled to the flooring 16 for receiving and collecting waste effluent in a reservoir 34 for controlled transport and/or disposal. The housing is mounted on a vehicle 28, preferably on the chassis 29.

More particularly, in one embodiment and application of the present invention, a solution to the longstanding and unmet need is provided, namely to have the ability to clean biohazardous equipment safely and thoroughly is a desirable innovation. The present invention addresses the need and provides a solution with a combination of factors: total enclosure of the equipment to be cleaned and the complete retention of all cleaning fluid, effluent, and particulate or debris; a removable or openable enclosure section, or a door or other opening within one enclosure section; and efficient drainage from within the enclosure to a reservoir or a collection container connected or connectable to the enclosure.

Generally, the mobile sanitary wash apparatus and systems of the present invention include an enclosure or a housing 12 having a plurality of vertically oriented sides that are connected at edges with a floor 16 and a ceiling 14 that opposes and is spaced apart from the floor. Preferably, one of the sides is removable, openable, or includes a door 18 that is movable between open and closed positions for allowing equipment or items to be cleaned and/or sanitized to be inserted into the enclosure or housing. Alternatively, at least one of the sides and/or top is removable and re-attachable, or closable, to allow the insertion of the equipment to be cleaned.

Figure 2:
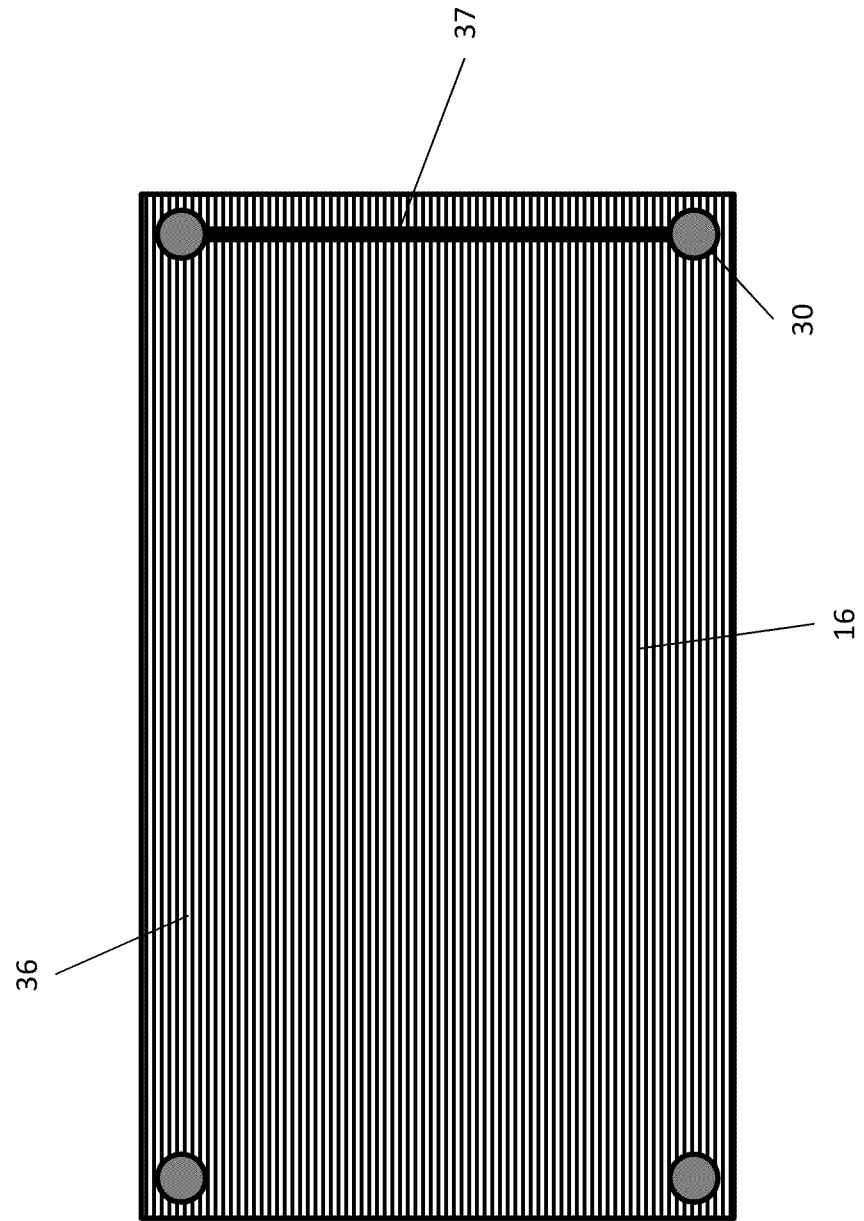
FIG. 2 is a schematic diagram illustrating a top view of the embodiment of FIG. 1.
Figure 3:
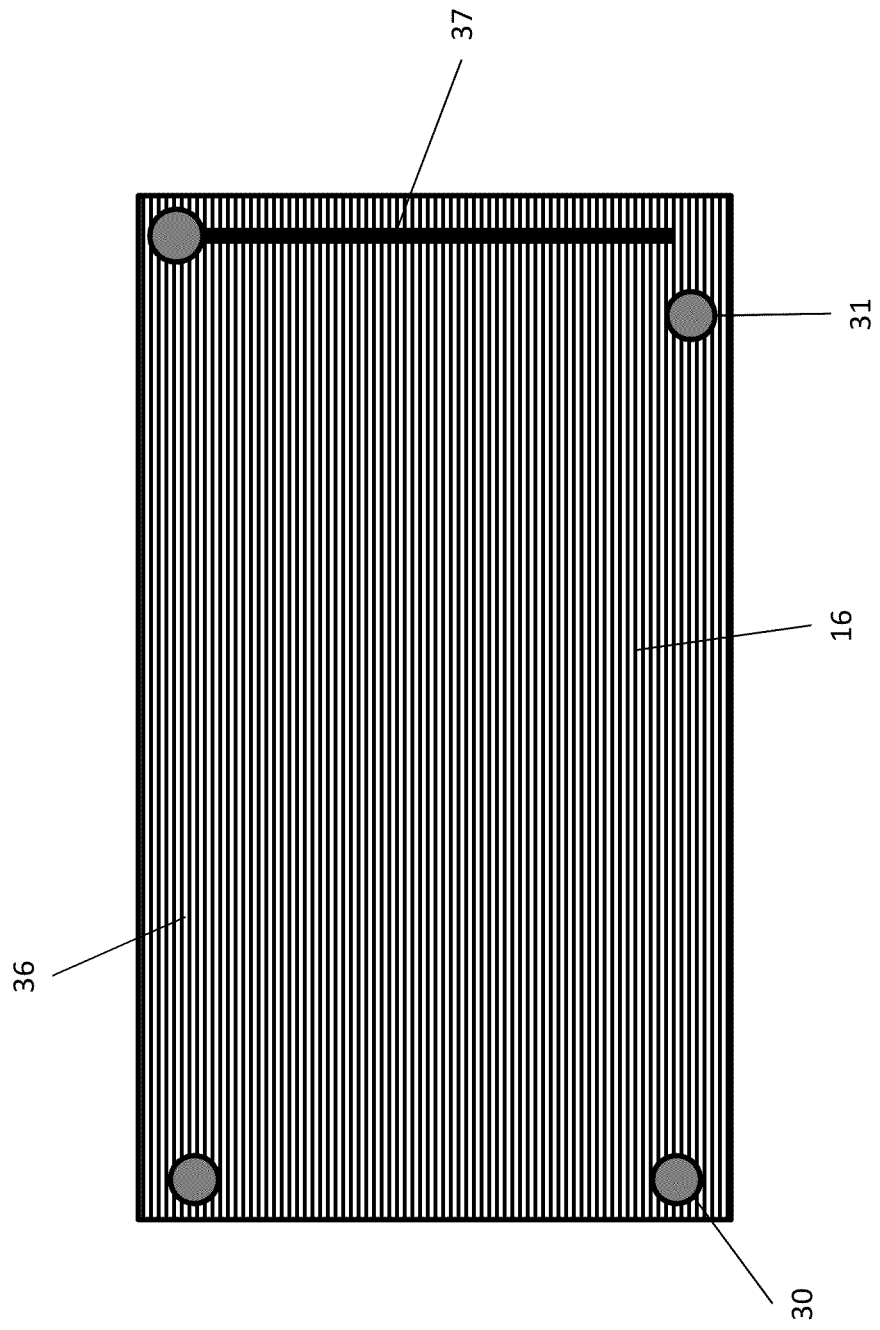
FIG. 3 is a schematic diagram illustrating a top view of an alternative embodiment.

In preferred embodiments of the present invention, as shown in FIG. 2, the floor 16 includes aluminum flooring with grooves 36 for improved drainage of the fluid from inside the enclosure or housing to an external receiving container or reservoir, which is connected by drain pipes or tubes that are attached to drain openings 30 in the floor, for allowing the fluid to drain from within the enclosure or housing by gravity causing the fluid to drain downwardly and out. At least one drain is provided in the floor. Preferably, a plurality of drain holes or openings are positioned in spaced-apart location in the floor. More preferably, the plurality of drain holes or openings are positioned near the corners of the vertically oriented sides or walls. And more preferably still, in one embodiment as illustrated in FIG. 3, at least three drain holes or openings 30 are positioned near different corners, and one drain hole or opening 31 is positioned near another corner but less spaced-apart from the sides than the others. In such an embodiment, one of the drain holes is positioned in the floor near one of the sides, between two corners, and less spaced apart from each of the corners to provide improved drainage of the waste effluent from within the enclosure, which is particularly effective when the mobile apparatus is positioned on uneven surfaces. While this offset drain hole is illustrated outwardly positioned from the corner compared with other hole-corner spacing, it may alternatively be positioned more inward toward the center of the floor.

In one embodiment of the present invention, as shown in FIG. 2, four drain holes are provided. Each of the drain holes is at least about three (3) inches in diameter for a circular hole, or equivalent area for a non-circular shape; preferably a filter cover is provided over the top of each of the drain holes. Also, in one embodiment of the present invention, the flooring includes grooves 36 for improved drainage of the waste effluent from within the enclosure toward these drain holes. Preferably, the grooves are spaced-apart, parallel channels and are at least about one (1) inches in width for each groove channel; this dimension is preferably not larger than about two (2) inches wide, to allow for equipment to be cleaned to easily roll across the flooring without being stuck within the grooves. Additionally or alternatively, there may be a single groove or trough 37 extending from at least one of the drain holes across the width dimension of the flooring to provide a drain trough having a width of about one (1) inch and extending substantially along one of the sides, e.g., the back side. The trough communicates with the channels and thereby connects the channels with at least one drain holes. The four drain holes and trough (or grooves) provide for effluent capture that is not grade dependent.

Figure 4:
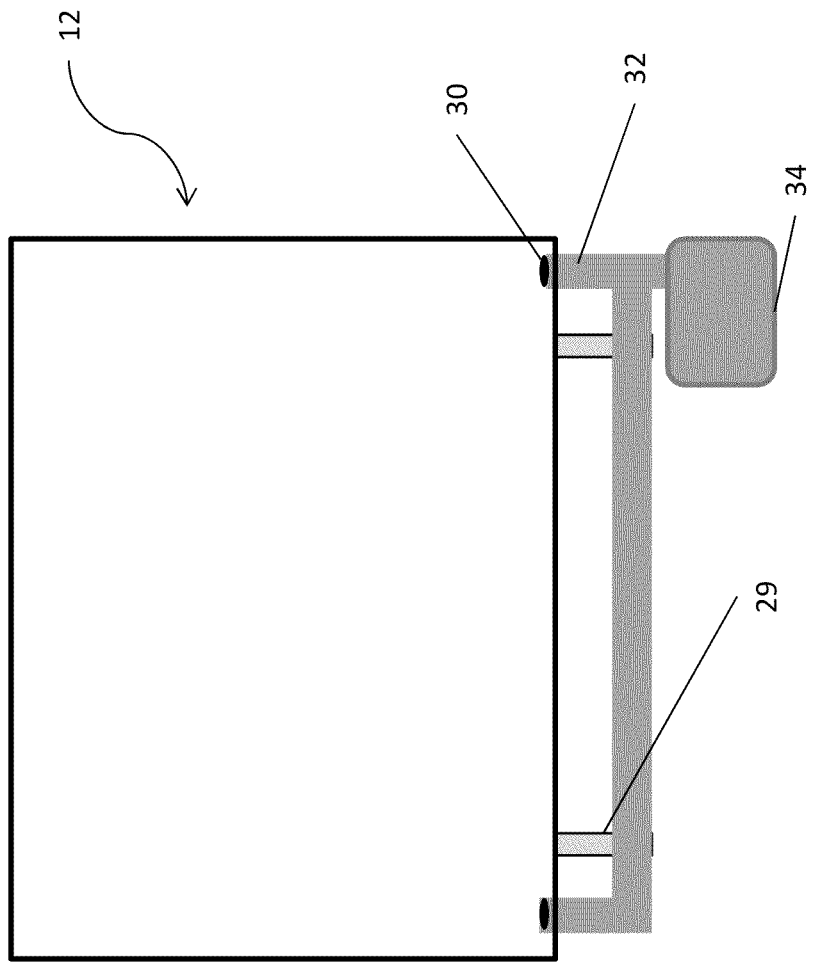
FIG. 4 shows another schematic diagram illustrating an end view of the embodiment of FIG. 1.

Also, as shown in FIGS. 1 and 4, a fluid collection system 32 is provided beneath the flooring 16, which provides for fluid collection and recovery to avoid contamination of groundwater or drainage, and the fluid collection system includes a reservoir or container 34 for receiving fluid flowing from inside the enclosure through the drain holes or openings 30, downwardly through drain pipes or tubes 38. The fluid collected is later disposed either directly at the location of the cleaning, or at a later time and/or location, by a pumping system that is constructed and configured to pump the collected fluid in the reservoir or container into a disposal system. This is particularly important for cleaning contaminated or biohazardous equipment, where all of the cleaning effluent must be captured or retained within the enclosure and then disposed of properly in accordance with regulations and laws governing waste disposal.

Regarding the material of the sides, floor and ceiling, the enclosure or housing is constructed of a material that is water-impervious, preferably of a metal material. In particular, the floors are metallic or otherwise water-impervious floors designed for efficient drainage of cleaning effluent or water. Most preferably, the floors are aluminum.

Importantly, the enclosure or housing is constructed and configured to be mobile for easy transport between locations for cleaning equipment or other large items. Preferably, the enclosure or housing is mounted onto a vehicle frame 29 or trailer frame for vehicular transport. By way of example and not limitation, dimensions of the housing may be about ten

(10) feet wide, about eight (8) feet tall, and about eighteen (18) feet long; with a corresponding water capture box or reservoir having dimensions about two (2) feet long, between about one (1) foot and about two (2) feet tall and wide.

The present invention is further directed to a specific application, namely the cleaning and sanitizing of large biohazardous equipment. This type of application demands that all the cleaning fluid be collected and not contaminate the environment. Thus, the enclosure needs to retain all fluids, especially spray droplets, and also provide for efficient drainage of the cabinet after usage. The present invention thus provides for enclosures and drainage floors designed to meet these requirements. However, the cleaning of various types of biohazardous equipment adds a new requirement, which is that because of the different shapes of equipment and the need to effectively clean all the surfaces of the equipment, the actual cleaning operation must be performed manually and cannot be completely automated. Thus, the application requires that different parts of the cabinet walls be removable such that the cleaning operator can access the various parts of the equipment when necessary. Thus a need exists for a wash cabinet that prevents the escape of washing fluids, drains well, and has removable walls or ceiling such that the equipment being cleaned is completely accessible by the cleaning operator.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. An apparatus for cleaning of equipment comprising:
an enclosure having: a plurality of vertically oriented sides that are connected at edges with each other; a floor; and a ceiling opposed and spaced apart from the floor;
wherein one of the sides is movable between an open and a closed position for allowing insertion of at least one item to be cleaned into the enclosure;
wherein the top of the floor is substantially horizontal;
wherein the floor of the enclosure does not include moveable components;
wherein the floor is aluminum;
wherein one of the plurality of vertically oriented sides is moveable between an open position and a closed position;
wherein one of plurality of vertically oriented sides is removable;
wherein the ceiling is removable and re-attachable;
the enclosure constructed of a fluid-impervious material for containing a waste effluent within the enclosure;
wherein the apparatus includes a reservoir for retaining all fluids after the fluids have left the enclosure;
a plurality of parallel spaced-apart drainage channels communication with at least one trough in the floor for providing efficient drainage of the waste effluent;
wherein the drainage channel are at least about one inch in width and the drainage channels are not more than about two inches in width;
a plurality of drain holes positioned in the floor near the corners of the sides for receiving the effluent, wherein each of the plurality of drain holes includes a filter cover;
drainage pipes connected to the plurality of drain holes for receiving the waste effluent and delivering the waste effluent to the reservoir; and
wherein the enclosure is positioned on a framework having wheels for transporting the apparatus;
wherein the enclosure is about 10 feet wide, 8 feet tall, and about 18 feet long;
wherein the reservoir is about 2 feet long, and between about 1 foot and about 2 feet tall, and between about 1 foot and about 2 feet wide;
wherein the drainage channels include drainage grooves, wherein the drainage grooves and the at least one trough communicate with at least one of the plurality of drain holes; and
thereby providing a closed system for cleaning equipment within the enclosure and storing the waste effluent outside the enclosure.

2. The apparatus of claim 1, wherein one of the drain holes is positioned in the floor closer to a corner to provide improved drainage of the waste effluent from within the enclosure.

3. The apparatus of claim 1, further including a pumping system for evacuating the waste effluent from the reservoir.

4. The apparatus of claim 1, wherein the plurality of drain holes are positioned such that the waste effluent drains through at least one of the drain holes when the apparatus is positioned on an uneven surface.

5. The apparatus of claim 1, wherein each of the plurality of drain holes is at least about 3 inches in diameter.

6. The apparatus of claim 1, wherein the plurality of drain holes are non-circular in shape.

7. The apparatus of claim 1, wherein at least one of the drainage channels extends from at least one of the drain holes.

8. The apparatus of claim 1, wherein the one of the plurality of vertically oriented sides that is moveable between the open position and the closed position is also removable.

9. A mobile system for cleaning of equipment comprising:
an apparatus including an enclosure having: a plurality of vertically oriented sides that are connected at edges with each other; a floor; and a ceiling opposed and spaced apart from the floor;
wherein one of the sides is movable between an open and a closed position for allowing insertion of at least one item to be cleaned into the enclosure;
wherein the top of the floor is substantially horizontal;
wherein the floor of the enclosure does not include moveable components;
wherein the floor is aluminum;
wherein one of the plurality of vertically oriented sides is moveable between an open position and a closed position;
wherein one of plurality of vertically oriented sides is removable;
wherein the ceiling is removable and re-attachable;
the enclosure constructed of a fluid-impervious material for containing a waste effluent within the enclosure;
wherein the apparatus includes a reservoir for retaining the waste effluent after the waste effluent has left the enclosure;
a plurality of parallel, spaced-apart drainage channels communicating with at least one trough in the floor for providing efficient drainage of the waste effluent;
wherein the drainage channels are at least about one inch in width and the drainage channels are not more than about two inches in width;
a plurality of drain holes positioned in the floor near the corners of the sides for receiving the effluent, wherein each of the plurality of drain holes includes a filter cover;

drainage pipes connected to the plurality of drain holes for receiving the waste effluent and delivering the waste effluent to the reservoir; and wherein the enclosure is positioned on a framework having wheels for transporting the apparatus;

wherein the drainage channels include drainage grooves, wherein the drainage grooves and the at least one trough communicate with at least one of the plurality of drain holes; and wherein the enclosure is sized, constructed, and configured for receiving and cleaning equipment and fully enclosing the equipment;

thereby providing a closed system for cleaning equipment within the enclosure and storing the waste effluent outside the enclosure.

10. The system of claim 9, wherein the apparatus is securely mounted on a motor vehicle for vehicular transport.

* * * * *